United States Patent
Damon et al.

(10) Patent No.: US 6,651,528 B2
(45) Date of Patent: Nov. 25, 2003

(54) PEDAL ASSEMBLY FOR CHILDREN'S RIDE-ON VEHICLES

(75) Inventors: Daniel J. Damon, West Seneca, NY (US); Gerald P. Sitarski, Grand Island, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 10/004,503

(22) Filed: Oct. 30, 2001

(65) Prior Publication Data

US 2003/0080528 A1 May 1, 2003

(51) Int. Cl.$^7$ ................................................ G05G 1/14
(52) U.S. Cl. ...................................................... 74/594.4
(58) Field of Search ............................... 74/560, 594.4, 74/594.5, 594.6, 594.7; 280/259

(56) References Cited

U.S. PATENT DOCUMENTS

| | | |
|---|---|---|
| 1,671,757 A | 5/1928 | Allen |
| 2,916,114 A | 12/1959 | Flora |
| 3,192,981 A | 7/1965 | Oliver |
| 3,717,047 A | 2/1973 | Hill |
| 3,967,432 A | 7/1976 | Starr |
| 4,052,082 A | 10/1977 | Jones et al. |
| 4,373,760 A * | 2/1983 | Durham ...................... 384/458 |
| 4,445,397 A * | 5/1984 | Shimano ...................... 74/560 |
| 4,488,844 A | 12/1984 | Baubles |
| 4,657,270 A | 4/1987 | Allen et al. |
| 4,838,115 A | 6/1989 | Nagano |
| 4,886,407 A | 12/1989 | Harbin |
| 5,032,047 A | 7/1991 | Theakston |
| 5,135,243 A | 8/1992 | Carpenter |
| 5,279,184 A * | 1/1994 | Ogino ...................... 74/594.6 |
| 5,409,437 A | 4/1995 | Lauro et al. |
| 5,489,175 A | 2/1996 | Winton, III |
| 5,499,834 A | 3/1996 | Pasin et al. |
| 5,538,377 A | 7/1996 | Stewart et al. |
| 6,106,207 A | 8/2000 | Kuzdak, III |
| 2002/0134192 A1 * | 9/2002 | Chang ...................... 74/594.4 |

FOREIGN PATENT DOCUMENTS

| | | |
|---|---|---|
| GB | 637352 | 5/1950 |
| GB | 1011600 | 12/1965 |

* cited by examiner

Primary Examiner—Kevin Hurley
(74) Attorney, Agent, or Firm—Kolisch Hartwell, P.C.

(57) ABSTRACT

A pedal assembly for a children's ride-on vehicle and children's ride-on vehicles including the same. The pedal includes a pedal with a body having a foot engagement surface adapted to support a rider's foot. The pedal further includes a bore adapted to receive a crankshaft extending at least partially through the body of the pedal and an alignment cavity at least partially coextensive with the bore and having a first opening adapted to receive a fastener in an operable orientation relative to the crankshaft. The pedal also includes a retention structure adapted to retain the fastener within the alignment cavity when the pedal is removed from the crankshaft. In some embodiments, the vehicle includes a fastener-retaining structure adapted to retain fasteners other than on the pedals.

53 Claims, 4 Drawing Sheets

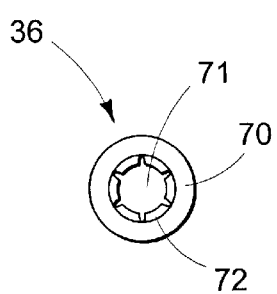
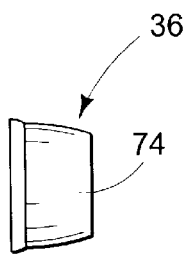
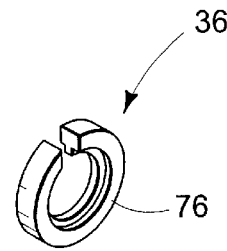
FIG. 7   FIG. 8   FIG. 9
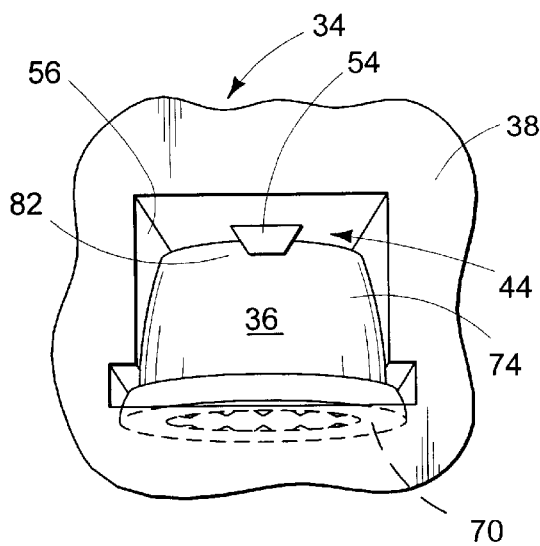
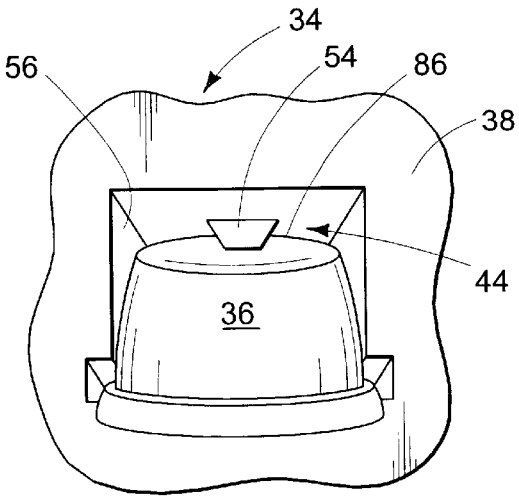
FIG. 10   FIG. 11
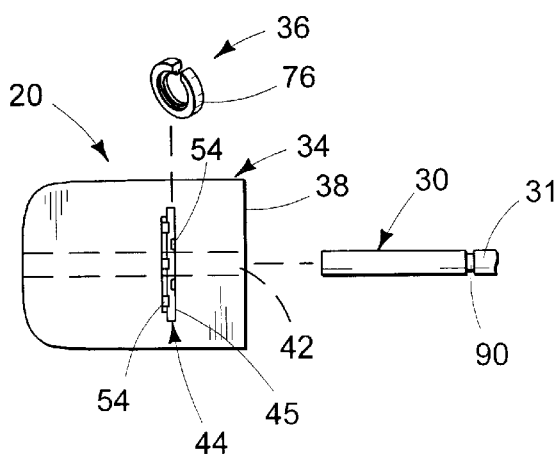
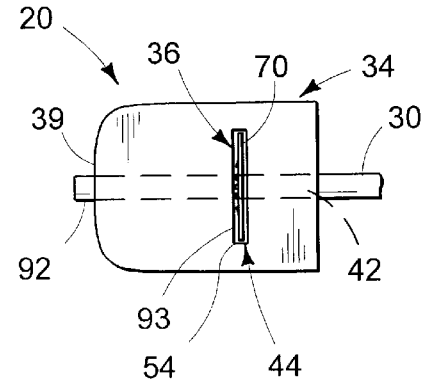
FIG. 12   FIG. 13

PEDAL ASSEMBLY FOR CHILDREN'S RIDE-ON VEHICLES

FIELD OF THE INVENTION

The present invention is directed to children's ride-on vehicles, and more particularly, to a pedal assembly for children's ride-on vehicles and children's ride-on vehicles incorporating the same.

BACKGROUND

Ride-on vehicles are popular toys for children. The vehicles are sized for operation by a child sitting on the vehicle's seat and may have a variety of shapes and configurations, including being reduced-scale versions of adult-sized vehicles. The vehicles may be pedal-powered and/or battery-powered and may include features that simulate features available on adult-sized vehicles.

Many children's ride-on vehicles are purchased partially assembled. For a child to use the vehicle, a purchaser typically must complete assembly of the vehicle. For example, assembly of children's ride-on vehicles may require a purchaser to attach various parts, such as pedals, wheels, seats, steering mechanisms, etc., to the body or frame of the vehicle. Attachment of the parts to the frame of the vehicle should be straightforward and uncomplicated, such that a purchaser may easily and properly assemble the children's vehicle. Proper assembly is important to ensure the proper operation of the vehicle and the safety of a child operating the children's ride-on vehicle.

SUMMARY OF THE INVENTION

The present invention provides an improved pedal assembly for a children's ride-on vehicle. The pedal assembly includes a pedal with a body having a foot engagement surface adapted to support a rider's foot. The pedal further includes a bore adapted to receive a crankshaft extending at least partially through the body of the pedal and an alignment cavity that is at least partially coextensive with the bore. The alignment cavity has a first opening adapted to receive a fastener in an operable orientation relative to the crankshaft. The pedal also includes a retention structure adapted to retain the fastener within the alignment cavity when the pedal is removed from the crankshaft. In some embodiments, the vehicle includes a fastener-retaining structure adapted to retain fasteners other than on the pedals.

BRIEF DESCRIPTION OF THE DRAWINGS

FIG. 7 is a top plan view of a fastener for use with a pedal in accordance with the present invention.

FIG. 8 is a side elevation view of another fastener.

FIG. 9 is a perspective view of another fastener.

FIG. 10 is a fragmentary perspective view of a pedal and a fastener in a first position, in which the fastener is substantially contained within an alignment cavity of the pedal.

FIG. 11 is a fragmentary perspective view of the pedal and fastener of FIG. 10 in a second position, in which the fastener is partially contained within the alignment cavity.

FIG. 12 is an exploded top plan view of another pedal assembly constructed in accordance with the present invention.

FIG. 13 is an assembled top plan view of the pedal assembly shown in FIG. 12.

DETAILED DESCRIPTION AND BEST MODE OF THE INVENTION

Figure 1:
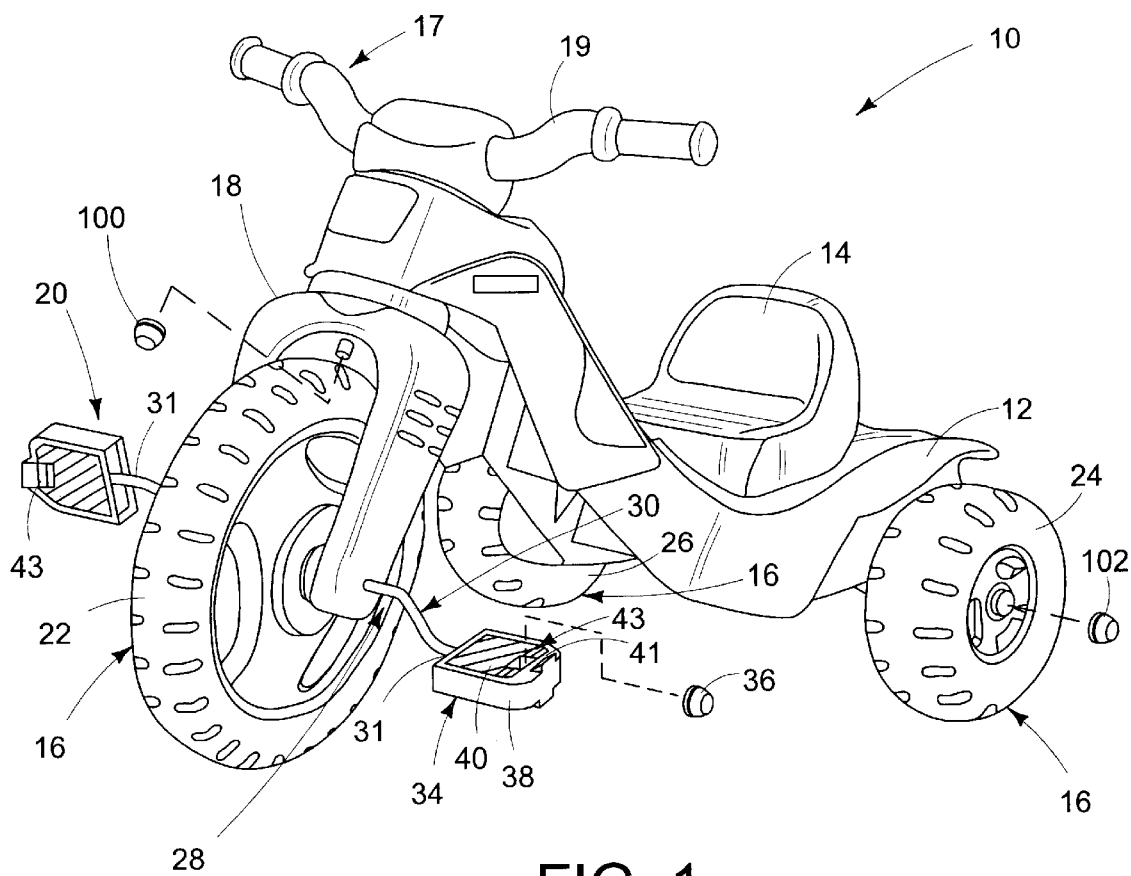
FIG. 1 is an isometric view of a children's ride-on vehicle constructed in accordance with the present invention.

A children's ride-on vehicle constructed according to the present invention is indicated generally at 10 in FIG. 1. Vehicle 10 includes a frame, or body, 12, seat 14, wheels 16, a steering assembly 17, and pair of pedal assemblies 20.

Children's ride-on vehicle 10 is sized for operation by a child. As shown, vehicle 10 takes the form of a pedal-powered tricycle. It is within the scope of the invention that vehicle 10 may resemble a reduced-scale or scaled-down version of a larger adult vehicle. For example, vehicle 10 may resemble a motorcycle, a truck, a car, a farm vehicle, an off-road vehicle, a construction vehicle, an airplane, a boat, etc. Alternatively, the vehicle may take the form of a child-sized fantasy vehicle. Vehicle 10 may include features that make vehicle 10 appealing to children. Thus, vehicle 10 may include features typically found on adult-sized vehicles, including, but not limited to, side doors, trunks, hoods, headlights, tail lights, windshields, wipers, license plates, etc. It should be understood that the present invention may be used on any children's ride-on, regardless of the particular body style and/or accessories of the particular vehicle, and such features are not essential and may vary without departing from the scope of the invention.

Regardless of the type of vehicle that children's ride-on vehicle 10 resembles, vehicle 10 includes a body or frame 12. Frame 12 is typically formed from moldable plastic, however, frame 12 may be formed from other suitable materials, such as metal or wood, and any such constructions or combinations thereof are within the scope of the invention.

Frame 12 includes a seat 14 that is adapted and sized to receive at least one child. Thus, seat 14 is generally sized and positioned to enable a child seated in seat 14 to operate vehicle 10. Seat 14 may be adjustable to enable children of different sizes to operate vehicle 10. For example, a child seated in seat 14 should be able to easily access steering assembly 17 and pedal assemblies 20.

Vehicle 10 also may include a plurality of wheels, which are generally indicated at 16 in FIG. 1. Wheels 16 are rotatively coupled to frame 12 and permit vehicle 10 to be driven across a ground surface. Vehicle 10 may include any number of wheels. For example, and as shown in FIG. 1, vehicle 10 may include three wheels, one front wheel 22 and two back wheels 24 and 26 respectively. Such a three-wheel configuration provides increased stability to vehicle 10, as compared to a two-wheeled vehicle that will be operated by a small child. However, as discussed above, the number of wheels may vary, and thus, vehicle 10 may include two, three, four, five or more wheels.

Wheels 16 may be the same size or may be different sizes. For example, as shown in FIG. 1, front wheel 22 of vehicle 10 may be a larger wheel than back wheels 24, 26. Alternatively, front wheel 22 may be substantially identical to back wheels 24, 26 or smaller than back wheels 24, 26. Thus, it should be understood that any combination of similarly sized and/or different sized wheels are within the scope of the invention.

A child rider may control the path along which vehicle 10 travels using steering assembly 17. Steering assembly 17 is coupled to at least one of wheels 16, such that the wheels may be turned, or pivoted, in a desired direction. Steering assembly 17 includes a steering column 18 that is connected to at least one of the vehicle's wheels, which may be referred to as a steerable wheel, and a steering mechanism 19 that is configured to be grasped by a child rider seated on seat 14. Steering mechanism 19 may be any steering device known in the art, including, but not limited to, handlebars, steering wheels, steering levers, etc. By way of illustration in FIG. 1, steering column 18 includes a fork assembly that straddles front wheel 22 and steering mechanism 19 takes the illustrative form of handlebars. The handlebars are positioned so that a child sitting on seat 14 may grasp the handlebars, and by pivoting the handlebars cause front wheel 22 to rotate about a steering axis and thereby steer the vehicle.

Figure 14:
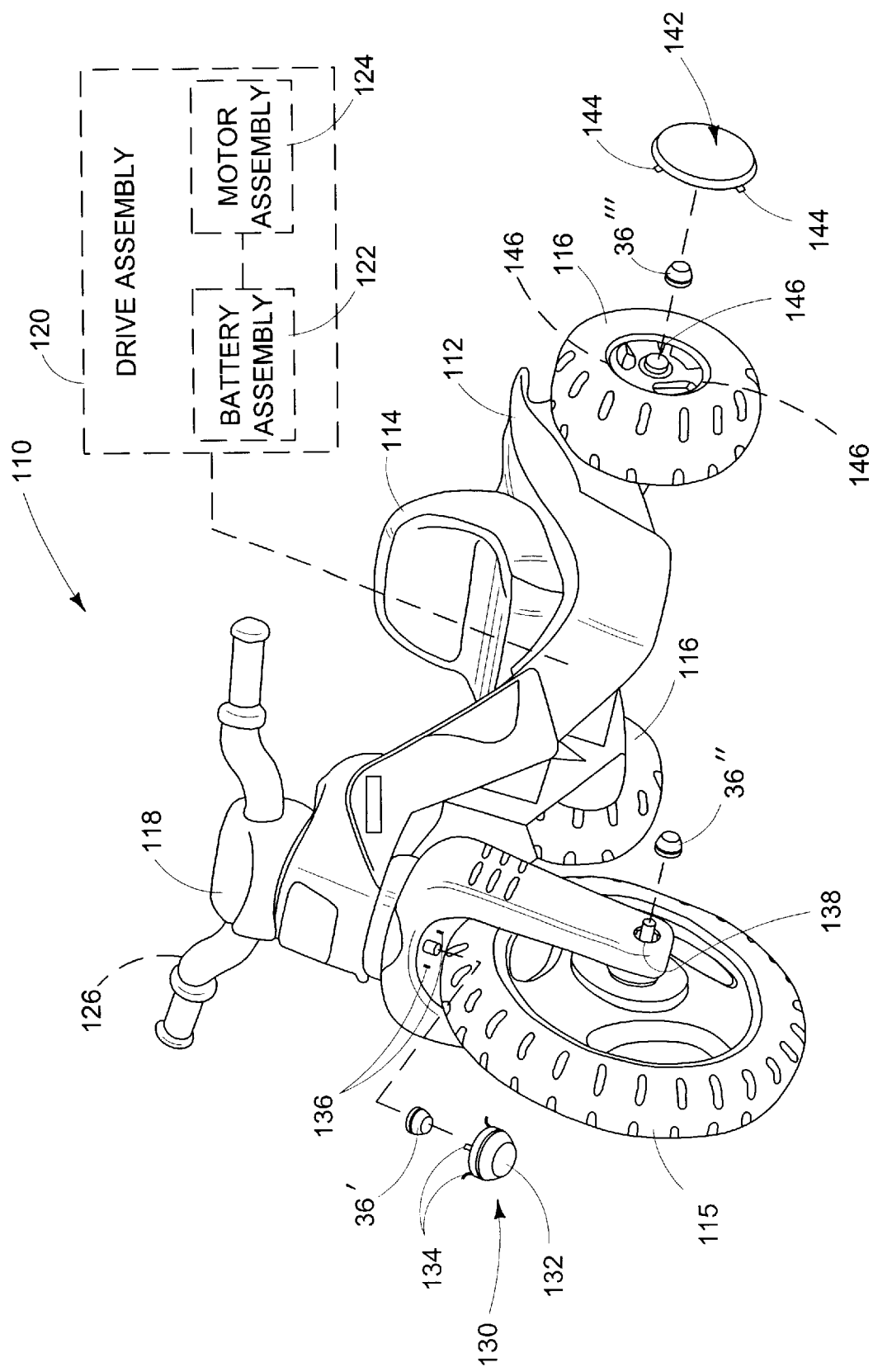
FIG. 14 is an isometric, partially exploded view showing another ride-on vehicle constructed in accordance with the present invention.

Vehicle 10 further includes a drive assembly adapted to drive at least one of wheels 16, which may be referred to as driven wheels. "Driven wheels" are driven in the sense that they receive rotational force that causes the rotation of the drive wheels about their axles or mounts to produce movement of vehicle 10. Any suitable drive assembly may be used in vehicle 10. For example, and as shown in FIG. 1, the drive assembly may include a crank assembly 28 coupled to at least one of wheels 16. As illustrated, crank assembly 28 is coupled with front wheel 22, which operates as the driven wheel in the illustrated vehicle. It should be appreciated that the drive assembly may be coupled to drive a front wheel (as illustrated in FIG. 1), a back wheel, multiple front wheels or back wheels, or any combination thereof. Additionally, any suitable drive assembly may be implemented on vehicle 10 including, but not limited to, crank assemblies (as illustrated in FIG. 1), chain assemblies, motor and battery assemblies (as illustrated in FIG. 14 and discussed in more detail below), gear assemblies, etc.

Crank assembly 28 operates to transmit to front wheel 22 a rotational force imparted by a child sitting on seat 14. Typically, crank assembly 28 includes a crankshaft 30 and at least one, and typically two, pedal assemblies 20. Crankshaft 30 may be operatively coupled with any one or more of the wheels 16 on vehicle 10. In FIG. 1, it can be seen that crankshaft 30 extends through front wheel 22 and includes end regions 31 upon which a pair of pedal assemblies 20 are mounted.

Figure 2:
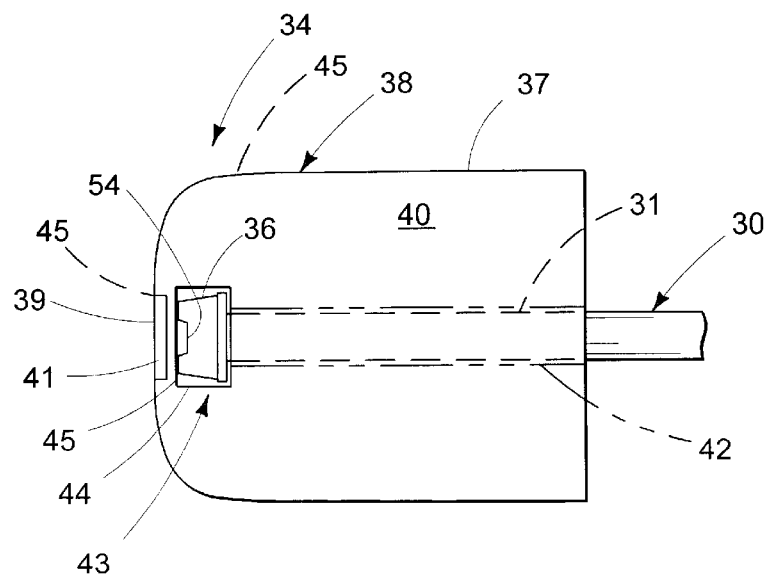
FIG. 2 is a top plan view of a pedal assembly constructed in accordance with the present invention.

Pedal assembly 20 includes a pedal 34 and a fastener 36. Pedal 34 is adapted to at least partially receive a portion of crankshaft 30. Pedal 34 is retained on crankshaft 30 via fastener 36 and configured to be contacted by a child operating vehicle 10. For example, as shown in FIGS. 1 and 2, body 38 of pedal 34 includes a foot engagement surface 40 that is adapted to support a rider's foot. Foot engagement surface 40 may, but does not necessarily, have various surface textures, including ridges, bumps, holes, grooves, etc. that provide a slip-resistant surface for a child's foot. As known in the art, pedal 34 may be fully rotatable on crankshaft 30 and thus, both the top and bottom surfaces of pedal 34 may have a foot engagement surface 40. Additionally, pedal 34 also may, but does not necessarily, include a foot retention structure 41 extending from foot engagement surface 40. Foot retention structure 41 may be adapted to provide a stop or flange positioned to prevent a rider's foot from slipping off the end of pedal 34.

Figure 3:
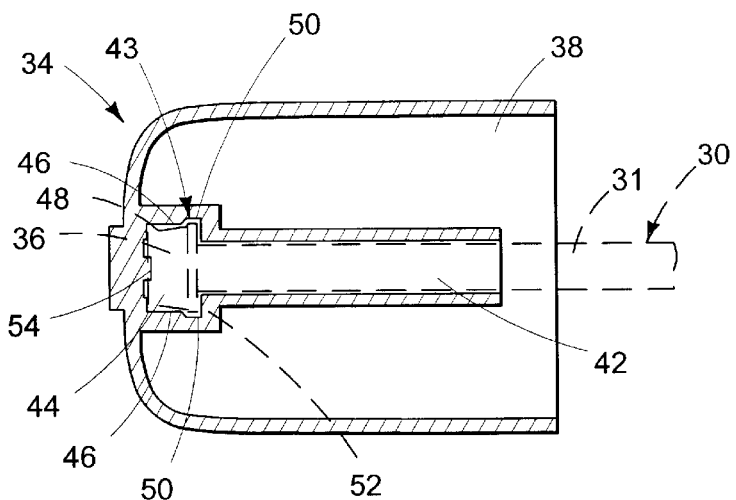
FIG. 3 is a cross-sectional view of a pedal constructed in accordance with the present invention.

In FIGS. 2 and 3, the operation and construction of pedal 34 may be more readily understood. More particularly, pedal 34 includes a bore 42 that extends at least partially through the body and is adapted to receive end region 31 of crankshaft 30. In FIG. 3, pedal 34 is substantially hollow, such that bore 42 is defined by a housing that is adapted to guide crankshaft 30 through the desired region of pedal 34. Alternatively, pedal 34 may be a solid pedal, such as shown in FIG. 2, and bore 42 may be a passage within the solid portion of pedal 34.

Pedal 34 further includes a fastener-retaining structure 43. Both pedal 34 and fastener-retaining structure 43 may be formed from moldable plastic, however any other suitable constructions are within the scope of the present invention. Similarly, structure 43 may be integrally formed with body 38, or separately formed and thereafter coupled to the pedal. Fastener-retaining structure 43 includes an alignment cavity 44 that is at least partially coextensive with bore 42. Alignment cavity 44 includes an opening 45, which is adapted to receive fastener 36 in an operable orientation relative to crankshaft 30. Alignment cavity 44 enables an assembler of vehicle 10 to position and align fastener 36 within pedal 34 to operatively receive end region 31 of crankshaft 30. By aligning fastener 36 within alignment cavity 44, a user may easily attach and secure pedal 34 to crankshaft 30.

In FIG. 2, opening 45 is formed in one of the pedal's foot engagement surfaces 40. It is within the scope of the invention that opening 45 may be formed elsewhere on body 38, with cavity 44 extending therefrom to be at least partially coextensive with bore 42. For example, cavity 44 may extend from an opening 45 in the pedal's sidewalls 37 or end wall 39, as indicated in dashed lines in FIG. 2.

Alignment cavity 44 may be of any size suitable to receive an appropriate fastener 36. Thus, as shown in FIG. 2, alignment cavity 44 may have dimensions that are sufficiently larger than the dimensions of fastener 36 so that fastener 36 may be inserted into alignment cavity 44 in a position for coupling to end region 31 while still permitting axial, lateral and/or longitudinal translation of the fastener within the cavity. For example, as shown in FIG. 2, cavity 44 is oversized relative to fastener 36 in all directions.

It is within the scope of the invention, however, that cavity 44 is sized to at least partially correspond to, or engage, a portion of fastener 36 inserted in an operative orientation therein. An example of such a configuration is shown in FIG. 3, in which alignment cavity 44 is sized to generally correspond to the shape of fastener 36. For example, the illustrated fastener 36 is accommodated in FIG. 3 by an alignment cavity 44 having sidewalls 46 that correspond to an upper region, or cap portion, 48 of fastener 36 and a channel 50 within sidewalls 46 that accommodates a lower portion 52 of fastener 36. As discussed, the particular dimensions and geometry of cavity 44 will be defined at least in part by the size and shape of fastener 36 and/or the mechanism by which the fastener is coupled to end region 31 of crankshaft 30.

Alignment cavity 44 may also be keyed to correspond to the shape of fastener 36. A keyed configuration limits the ways that fastener 36 may be inserted into alignment cavity 44. For example, a keyed alignment cavity, such as shown in FIG. 3, prevents fastener 36 from being inserted into cavity 44 in a non-operable configuration, i.e., a configuration in which the fastener is not oriented to be coupled to the crankshaft to retain the pedal on the crankshaft. Thus, a keyed configuration may prevent fastener 36 from being mispositioned within alignment cavity 44 and incorrectly attached to crankshaft 30.

Fastener-retaining structure 43 further includes a retention structure 54. Retention structure 54 is adapted to restrict unintentional release of fastener 36 from alignment cavity 44. Additionally, or alternatively, retention structure 54 may be configured to retain fastener 36 within alignment cavity 44 even when pedal 34 is removed from crankshaft 30. Thus, retention structure 54 may prevent fastener 36 from falling out of pedal 34, regardless of whether fastener 36 is attached to crankshaft 30 or not.

Furthermore, retention structure 54 retains fastener 36 within alignment cavity 44 when pedal 34 is intentionally or unintentionally removed from crankshaft 30. Thus, if pedal 34 is subsequently removed or released from crankshaft 30 after full construction of vehicle 10, pedal assembly 20 will remain intact, thereby preventing the fastener from being removed from the pedal, where it may be lost or become a small object that normally is kept away from small children.

In some embodiments, retention structure 54 and cavity 44 may separately or cooperatively position the fastener for coupling to end region 31 of crankshaft 30. Such an embodiment enables a user to easily attach crankshaft 30 to pedal 34, because the fastener does not need to be separately held by the user and positioned while simultaneously attempting to attach crankshaft 30 to pedal 34. Instead, alignment cavity 44 and/or retention structure 54 position and support fastener 36 in an operative position relative to bore 42, thereby enabling a user to simply align and insert crankshaft 30 into bore 42 and screw, or otherwise rotate, pedal 34 to couple pedal 34 to crankshaft 30. Similarly, after removal, the pedal assembly may be subsequently reattached to crankshaft 30 without requiring reinsertion and/or repositioning of fastener 36.

Figure 4:
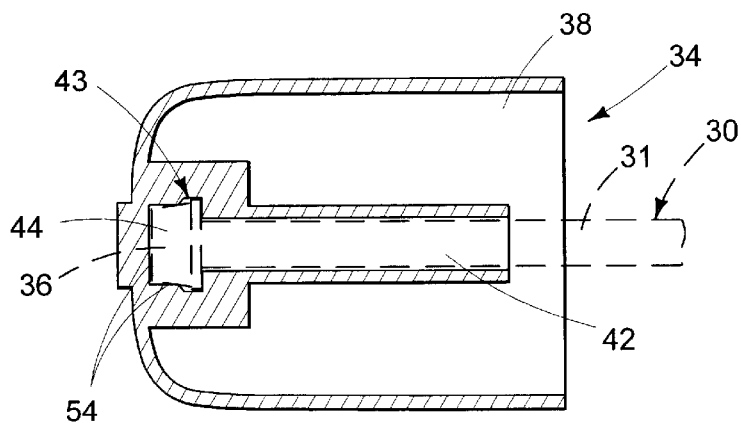
FIG. 4 is a cross-sectional view of another pedal constructed in accordance with the present invention.

FIG. 4 shows an alternative configuration for alignment cavity 44. As illustrated, alignment cavity 44 is sized so that it frictionally engages fastener 36 such that frictional resistance retains the fastener within the alignment cavity. By "frictional resistance," it is meant that the fastener is engaged by corresponding portions of the cavity's walls to retain the fastener within the cavity and to restrict or prevent translation of the fastener within the cavity. Accordingly, in such an embodiment, retention structure 54 is provided by the cavity's walls themselves. In FIG. 4, cavity 44 is shown with opposing sets of end walls 51 and sidewalls 53 that each form a frictional retention structure 54, but is within the scope of the invention that only a single frictional retention structure may be used, such as with cavity 44 having opposed sidewalls that engage fastener 36 and end walls that do not, or vice versa.

Figure 5:
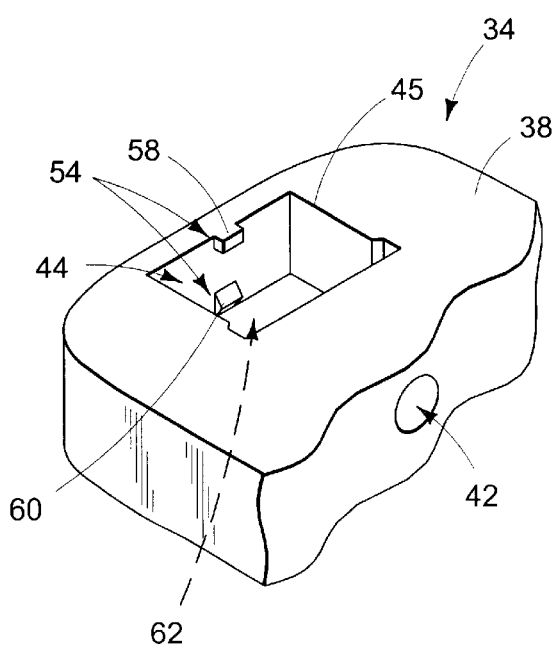
FIG. 5 is a fragmentary isometric view of another pedal constructed in accordance with the present invention.
Figure 6:
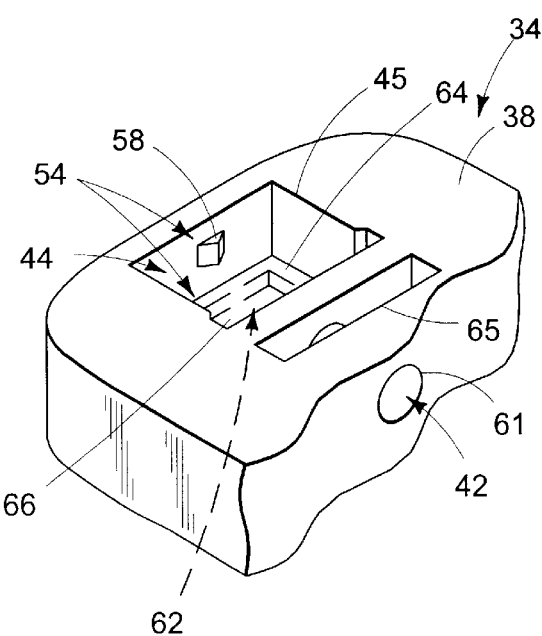
FIG. 6 is a fragmentary isometric view of another pedal constructed in accordance with the present invention.

In FIGS. 5 and 6, further illustrative examples of pedals with retention structures 54 are shown. In FIG. 5, retention structure 54 includes a protuberance, or tooth, 58 that is adapted to at least partially obstruct or block opening 45. Protuberance 58 may also be described as a stop, ledge or projection. Although illustrated as only extending partially across opening 45, protuberance 58 may extend any distance across opening 45. For example, protuberance 58 may span the entire opening. Alternatively or additionally, protuberance 58 may be positioned such that it extends partially into alignment cavity 44. Such a protuberance may be adapted to engage fastener 36 within alignment cavity 44. Thus, regardless of the size or position of protuberance 58, protuberance 58 is adapted to retain fastener 36 at least partially within alignment cavity 44 and to restrict at least unintentional removal of fastener 36 from pedal 34.

Retention structure 54 may include more than one protuberance. Thus, as shown in FIG. 5, a first protuberance 58 may partially block (first) opening 45, while a second protuberance 60 may partially block a second opening 62. Although only two protuberances are shown, any number of protuberances or similar structures may be used to obstruct removal of fastener 36 from alignment cavity 44. Moreover, although protuberances 58, 60 are shown to be generally the same size, it should be understood that any combination of different sized protuberances are within the scope of the invention. For purposes of illustration, protuberance 58 is shown extending partially across opening 45, and protuberance 60 is shown extending into cavity 44.

Referring now to FIG. 6, another illustrative position for protuberance 58 is shown, namely, projecting from an end wall of the cavity such that the protuberance is at least generally aligned with the long axis of bore 42. As also shown in FIG. 6, retention structure 54 may further include a spanning member 64. Opposite opening 45 of alignment cavity 44, spanning member 64 may extend transversely across at least a portion of second opening 62 of alignment cavity 44. Spanning member 64 may even form a solid wall, in which case opening 62 would not be present in that particular embodiment of the pedal. Also shown in FIG. 5 is a second cavity 65, which is spaced-apart from cavity 44 and positioned closer to the opening 61 in body 38 through which bore 42 extends. Cavity 65 may be used for visual alignment or positioning of end region 31 as it is inserted through bore 42 toward fastener 36. Pedal 34 may also be constructed without cavity 65. Alternatively, spanning member 64 may have an opening or window 66 that enables removal of fastener 36 from alignment cavity 44. For example, a user may be able to contact fastener 36 (via a digit, nail, writing implement, or other suitable device) through window 66 and urge fastener 36 out of alignment cavity 44 through first opening 45. Typically, window 66 is sized such that fastener 36 is unable to be removed through spanning member 64 and second opening 62.

Turning now to FIGS. 7–9, a variety of fasteners 36 are shown. Fastener 36 may be any suitable type of fastener that is capable of being releasably coupled to crankshaft 30 to secure pedal 34 on crankshaft 30 in an aperture orientation. For example, in FIG. 7 fastener 36 takes the form of a lock washer or ring nut 70. Lock washer 70 includes a central passage 71 through which end region 31 is inserted, and a plurality of teeth, or other crankshaft-engaging structures, 72 that are configured to engage crankshaft 30 and restrict withdrawal of the crankshaft from passage 71.

As shown in FIG. 8, a cap 74 may be used in conjunction with lock washer 70. Such a configuration is illustrated in FIG. 10 and may be referred to as a cap nut, or end cap, fastener because end region 31 is inserted into, but not through, the fastener. Cap 74 and washer 70 may be integrally formed or formed separately and thereafter joined together.

FIG. 9 shows another example of a suitable construction for fastener 36. As illustrated, fastener 36 includes an expandable ring 76 that is biased to constrict around crankshaft 30. Ring 76 (or the terminal end of the crankshaft) may include a tapered edge to facilitate easier insertion of the end region through ring 76.

Turning now to FIG. 10, a fastener 36 is shown in a first position where the fastener is at least substantially contained within alignment cavity 44 of pedal 34. Although fastener 36 is illustrated as having a cap 74 and a lock washer 70, any suitable fastener configuration may be used without departing from the scope of the invention. Moreover, as shown in the exemplary illustration, alignment cavity 44 may generally conform, as described above, to the shape and size of cap 74. Retention structure 54, which is shown as a protuberance, may extend partially into opening 45. As a consequence of the configuration, insertion of fastener 36 requires a user to push fastener 36 past retention structure 54, such that it is at least substantially received within alignment cavity 44 and retention structure 54 engages the outer side of fastener 36 to prevent the unintentional removal of the fastener from the cavity. Thus, fastener 36 may be snap-fit into pedal 34 as it is forcibly inserted into alignment cavity 44.

As illustrated in FIG. 10, fastener 36 is retained within alignment cavity 44 via retention structure 54. More particularly, fastener 36 includes a first engagement flange or contact region 82 that is adapted to engage retention structure 54 when the fastener is in the first position. First contact region 82 may include the external rim of fastener 36. Alternatively, the upper surface of fastener 36 may include a plurality of ridges, each ridge extending outwards from the top of the fastener. The respective ridge or rim may contact or align with retention structure 54 when fastener 36 is substantially contained within alignment cavity 44. In other words, first contact region 82 is the point of interaction between retention structure 54 and fastener 36 when fastener 36 is substantially contained within alignment cavity 44.

Retention structure 54 may be further configured to retain fastener 36 in a partially-released position, such as shown in FIG. 11. More specifically, fastener 36 may include a second engagement flange (or contact surface) 86, such as an internal edge, or recessed region, of fastener 36. This second engagement flange is adapted to engage retention structure 54 when the fastener is in the second position, in which fastener 36 is partially contained within alignment cavity 44. Thus, even if the fastener is forced out of alignment cavity 44, retention structure 54 may operate to prevent full release of fastener 36 from pedal 34 by retaining fastener 34 in the partially-released position.

As discussed above, fastener 36 may have a variety of shapes and configurations, including but not limited to those illustrated in FIGS. 7–9. An example of a pedal assembly 20 that utilizes a fastener 36 other than an end cap fastener is shown in FIG. 10, in which fastener 36 takes the form of an expandable ring 76. As shown, FIG. 12 illustrates another embodiment of the present invention. As shown, pedal 34 includes a bore 42 that extends through the entire body of pedal 34. As a consequence, crankshaft 30 may extend entirely through pedal 34. An alignment cavity 44, may be positioned anywhere within pedal 34 such that it is coextensive with bore 42. Alignment cavity 44 may be configured to receive a fastener 36 that permits crankshaft 30 to extend through it. For example, fastener 36 may be an expandable ring. Crankshaft 30 includes a connection region 90, whereby the fastener may be coupled to, or seated upon, crankshaft 30. Furthermore, and as described above, fastener 36 is retained within alignment cavity 44 via a retention structure 54. As illustrated in FIG. 12, retention structure 54 includes at least one protuberance on both sides of opening 45, but it is within the scope of the invention that the at least one protuberance may extend from only one side of the opening, may extend at least partially within the cavity, or may have any of the other structures described herein.

When fastener 36 is configured so that end region 31 may extend through the fastener, it is within the scope of the invention that bore 42 may extend completely through the pedal, such as indicated in dashed lines in FIG. 12. This configuration is also illustrated in FIG. 13, in which a terminal end 92 of crankshaft 30 is shown projecting from end wall 39 of the pedal. FIG. 13 also provides an illustrative example of a pedal assembly 20 in which fastener 36 takes the form of a lock washer 70, with retention structure 54 taking the illustrative configuration of a frictional retention of the fastener between the opposed end walls 93 of cavity 44.

It is within the scope of the invention that the above-described fastener-retaining structure may be used on components of vehicle 10 other than pedals. For example, the present disclosure may be applied to fasteners used on wheels, seats, steering assemblies, etc. Thus, as shown in FIG. 1, a fastener 100 may be used to attach steering assembly 17 to vehicle 10. Additionally, a fastener 102 may be used to attach wheels 16 to vehicle 10. Each of these fasteners may be received and selectively retained in structures similar to those described in relation to pedal assembly 20.

It should be further understood that the above-described fastener-retaining structure may be used on children's ride-on vehicles having configurations other than the illustrative embodiment shown in FIG. 1. For example, in FIG. 14, another children's ride-on vehicle is shown generally at 110. Vehicle 110 includes a frame 112, a seat 114, wheels 115 and 116, steering assembly 118 and drive assembly 120.

Drive assembly 120 includes a battery assembly 122 and a motor assembly 124. Battery assembly 122 includes one or more batteries. For example, battery assembly 122 may include one or more four-, six- and/or twelve-volt batteries adapted to power motor assembly 124. Motor assembly 124 is adapted to be powered by battery assembly 122 and includes at least one motor adapted to drive at least one of the vehicle's wheels, such as wheels 116. Motor assembly 124 may be coupled directly to the driven wheel(s) or may be indirectly coupled to the driven wheel(s) through a motor output linkage assembly, such as gears, belts, etc. Vehicle 110 further includes an actuator 126, such as an on/off switch, throttle, foot pedal or other device positioned for actuation by a child sitting on seat 114 to activate motor assembly 124.

Fastener-retaining structures may be used on vehicle 110, in accordance with the present embodiment, at any interface where fasteners are typically used. For example, the above-described fastener-retaining structure may be used in combination with a fastener to attach steering assembly 118 to vehicle 110. An example of such a structure is shown in FIG. 14 at 130. Structure 130 includes a body 132 that is adapted to cover, or at least partially overlie, a fastener 36', which may have any of the configurations described and/or illustrated herein. Body 132 is removably coupled to the vehicle's body by any suitable mounting structure, such as a plurality of projecting mounts 134 and corresponding receptacles 136. Another illustrative example of such a fastener-retaining structure is generally indicated at 138 and is used to retain a fastener 36" in engagement with the front fork of steering assembly 118. As shown, structure 138 defines a recess within the fork (or other portion of body 112) and fastener 36" is received into the recess. Structure 138 includes at least one projection (or protuberance) that extends at least partially across and/or into the recess to prevent the unintentional removal of the fastener from the recess. Yet another example is shown at 142 and is used to overlie a fastener 36'" that secures one of the vehicle's wheels to the axle upon which the wheel is mounted. As shown, structure 142 generally resembles a hubcap and defines with the hub portion of the wheel an enclosure in which fastener 36''' is housed. Therefore, even if the wheel is removed from the axle, the fastener will be retained within the enclosure. In the illustrated embodiment, structure 142 includes mounts 144 that cooperate with receptacles 146 to secure the structure to the wheel; however, any suitable mounting structure may be used.

As described above, a fastener-retaining structure may be used on a children's vehicle at any juncture where two or more parts are coupled together via a fastener. For example, the fastener-retaining structure for a pedal includes an alignment cavity adapted to receive and align a fastener in an operable orientation relative to a crankshaft. Additionally, the fastener-retaining structure may include a retention structure adapted to retain the fastener within the alignment cavity when the pedal is removed from the crankshaft. While various alternative embodiments and arrangements of such a fastener-retaining structure have been shown and described above, it will be appreciated by those of skill in the art, that numerous other embodiments, arrangements, and modifications are possible and are within the scope of the invention.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Where claims recite "a" or "a first" element or equivalent thereof, such claims should be understood to include incorporation of one or more such elements, neither requiring, nor excluding, two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of those claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A pedal for a children's ride-on vehicle, the pedal comprising:
    a body having a foot engagement surface adapted to support a rider's foot;
    a bore extending at least partially through the body and adapted to receive a crankshaft;
    an alignment cavity at least partially coextensive with the bore and having an opening adapted to receive a fastener in an operable orientation relative to the crankshaft; and
    a retention structure adapted to retain the fastener at least partially within the alignment cavity and restrict removal of the fastener from the alignment cavity through the opening when the pedal is removed from the crankshaft.

2. The pedal of claim 1, wherein the alignment cavity is sized to generally correspond to the shape of the fastener.

3. The pedal of claim 2, wherein the alignment cavity is keyed to the shape of the fastener to prevent the fastener from being inserted into the cavity in a non-operable orientation.

4. The pedal of claim 1, wherein the alignment cavity is adapted to frictionally engage the fastener to retain the fastener within the alignment cavity.

5. The pedal of claim 1, wherein the retention structure includes a protuberance adapted to at least partially obstruct the opening in the alignment cavity.

6. The pedal of claim 1, wherein the retention structure includes a protuberance adapted to at least partially extend across the opening in the alignment cavity to obstruct removal of the fastener from the alignment cavity.

7. The pedal of claim 1, wherein the retention structure includes at least one protuberance adapted to extend partially into the alignment cavity and adapted to retain the fastener at least partially within the alignment cavity.

8. The pedal of claim 1, wherein the opening in the alignment cavity is a first opening, wherein the alignment cavity has a second opening, and further wherein the retention structure includes a first protuberance at least partially obstructing the first opening and a second protuberance at least partially obstructing the second opening to restrict removal of the fastener from the alignment cavity.

9. The pedal of claim 1, wherein the opening in the alignment cavity is a first opening, wherein the alignment cavity has a second opening, and further wherein the retention structure further includes a spanning member that extends at least partially across the second opening and is adapted to restrict removal of the fastener from the second opening.

10. The pedal of claim 9, wherein the spanning member includes a window adapted to permit a user to contact the fastener such that the fastener may be urged through the first opening and released from the alignment cavity.

11. The pedal of claim 1, wherein the retention structure is adapted to engage a first engagement flange on the fastener to position the fastener substantially within the cavity when the pedal is removed from the crankshaft.

12. The pedal of claim 1, wherein the retention structure is adapted to engage a second engagement flange on the fastener to retain the fastener partially within the cavity when the pedal is removed from the crankshaft.

13. The pedal of claim 1, in combination with a fastener adapted to be received into the alignment cavity through the opening and selectively retained at least partially within the alignment cavity by the retention structure.

14. The pedal of claim 13, wherein the fastener includes a cap adapted receive an end of the crankshaft.

15. The pedal of claim 13, wherein the fastener includes an expandable ring that is biased to constrict around the crankshaft.

16. The pedal of claim 13, in further combination with a children's ride-on vehicle comprising a frame with a seat sized to receive a child, a plurality of wheels rotatably coupled to the frame, a crankshaft coupled with at least one of the plurality of wheels to drive rotation of the at least one of the plurality of wheels and including a pair of ends that respectively extend into the bores of a pair of the pedals and are retained therein by a pair of the fasteners.

17. A pedal assembly adapted to be attached to a crankshaft of a children's ride-on vehicle, the pedal assembly comprising:
   a fastener adapted to be secured to a crankshaft; and
   a pedal comprising:
      a body;
      a bore extending at least partially through the body adapted to receive the crankshaft;
      an alignment cavity at least partially coextensive with the bore, wherein the alignment cavity includes an opening adapted to receive the fastener into the alignment cavity; and
      a retention structure adapted to retain the fastener at least partially within the alignment cavity and restrict removal of the fastener from the alignment cavity through the opening when the pedal is removed from the crankshaft.

18. The pedal assembly of claim 17, wherein the alignment cavity is sized to generally correspond to the shape of the fastener.

19. The pedal assembly of claim 17, wherein the alignment cavity is keyed to the shape of the fastener.

20. The pedal assembly of claim 17, wherein the alignment cavity is adapted to frictionally engage the fastener to retain the fastener within the alignment cavity.

21. The pedal assembly of claim 17, wherein the retention structure includes a protuberance adapted to at least partially obstruct the opening in the alignment cavity.

22. The pedal assembly of claim 17, wherein the retention structure includes a protuberance adapted to at least partially extend across the opening in the alignment cavity to obstruct removal of the fastener from the alignment cavity.

23. The pedal assembly of claim 17, wherein the fastener is adapted to be snap-fit into the alignment cavity.

24. The pedal assembly of claim 17, wherein the fastener includes a first engagement flange adapted to engage the retention structure in a first position, in which the fastener is substantially contained within the alignment cavity.

25. The pedal assembly of claim 24, wherein the fastener includes a second engagement flange adapted to engage the retention structure in a second position, in which the fastener is partially contained within the alignment cavity.

26. The pedal assembly of claim 17, wherein the fastener includes a lock washer.

27. The pedal assembly of claim 17, wherein the fastener includes a ring having teeth adapted to engage the crankshaft.

28. The pedal assembly of claim 27, wherein the fastener includes a cap.

29. The pedal assembly of claim 17, wherein the fastener includes an integral cap and lock nut adapted to engage the crankshaft.

30. The pedal assembly of claim 17, wherein the fastener an expandable ring biased to constrict around the crankshaft.

31. A children's ride-on vehicle comprising:
   a frame having a seat sized to receive a child;
   a plurality of wheels rotatably coupled to the frame;
   a crankshaft coupled with at least one of the plurality of wheels to drive rotation of the at least one of the plurality of wheels; and
   a pair of pedal assemblies operatively coupled to the crankshaft, each pedal assembly comprising:
      a fastener adapted to secure a pedal onto the crankshaft, and
      a pedal having a body with a bore extending at least partially through the body and adapted to receive the crankshaft, an alignment cavity at least partially coextensive with the bore and adapted to receive and align the fastener in an operable orientation relative to the crankshaft, and a retention structure adapted to retain the fastener within the alignment cavity when the pedal is removed from the crankshaft, wherein the alignment cavity includes an opening through which the fastener is inserted into the alignment cavity and further wherein the retention structure is adapted to restrict removal of the fastener through the opening when the pedal is removed from the crankshaft.

32. The children's ride-on vehicle of claim 31, wherein each alignment cavity is sized to generally correspond to the shape of the fastener that is received therein.

33. The children's ride-on vehicle of claim 31, wherein each alignment cavity is keyed to correspond to the shape of the fastener that is received therein.

34. The children's ride-on vehicle of claim 31, wherein each alignment cavity is adapted to frictionally engage the corresponding fastener to retain the fastener within the alignment cavity.

35. The children's ride-on vehicle of claim 31, wherein each fastener is adapted to be snap-fit into the corresponding alignment cavity.

36. The children's ride-on vehicle of claim 31, wherein each fastener includes a first engagement flange adapted to engage the corresponding retention structure in a first position, in which the fastener is substantially contained within the alignment cavity.

37. The children's ride-on vehicle of claim 36, wherein each fastener includes a second engagement flange adapted to engage the corresponding retention structure in a second position, in which the fastener is partially contained within the alignment cavity.

38. A children's ride-on vehicle comprising:
   a frame having a seat sized to receive a child;
   a plurality of wheels rotatably coupled to the frame;
   a crankshaft coupled with at least one of the plurality of wheels to drive rotation of the at least one of the plurality of wheels; and
   a pair of pedal assemblies operatively coupled to the crankshaft, each pedal assembly comprising:
      a fastener adapted to secure a pedal onto the crankshaft; and
      a pedal having a body with a bore extending at least partially through the body and adapted to receive the crankshaft, an alignment cavity at least partially coextensive with the bore and adapted to receive the fastener through an opening and to align the fastener in an operable orientation relative to the crankshaft, and a retention structure adapted to retain the fastener within the alignment cavity when the pedal is removed from the crankshaft, wherein the retention structure includes a protuberance adapted to at least partially obstruct the opening in the alignment cavity to restrict removal of the fastener through the opening.

39. The children's ride-on vehicle of claim 38, wherein each protuberance is adapted to at least partially extend across the corresponding opening in the alignment cavity to obstruct removal of the fastener from the alignment cavity.

40. The children's ride-on vehicle of claim 38, wherein each alignment cavity is sized to generally correspond to the shape of the fastener received therein.

41. The children's ride-on vehicle of claim 38, wherein each alignment cavity is keyed to correspond to the shape of the fastener received therein.

42. The children's ride-on vehicle of claim 38, wherein each alignment cavity is adapted to frictionally engage the fastener to retain the corresponding fastener within the alignment cavity.

43. A pedal for a children's ride-on vehicle, the pedal comprising:
- a body having a foot engagement surface adapted to support a rider's foot;
- a bore extending at least partially through the body and adapted to receive a crankshaft;
- an alignment cavity at least partially coextensive with the bore and having a first opening adapted to receive a fastener in an operable orientation relative to the crankshaft; and
- a retention structure adapted to retain the fastener within the alignment cavity when the pedal is removed from the crankshaft, wherein the retention structure includes a protuberance adapted to at least partially obstruct the first opening in the alignment cavity.

44. The pedal of claim 43, wherein the protuberance is adapted to at least partially extend across the first opening in the alignment cavity to obstruct removal of the fastener from the alignment cavity.

45. The pedal of claim 43, wherein the alignment cavity has a second opening, wherein the protuberance is a first protuberance that is adapted to at least partially obstruct the first opening, and further wherein the retention structure includes a second protuberance at least partially obstructing the second opening to restrict removal of the fastener from the alignment cavity through the second opening.

46. The pedal of claim 43, wherein the alignment cavity has a second opening, and further wherein the retention structure further includes a spanning member that extends at least partially across the second opening and is adapted to restrict removal of the fastener from the second opening.

47. The pedal of claim 46, wherein the spanning member includes a window adapted to permit a user to contact the fastener such that the fastener may he urged through the first opening and released from the alignment cavity.

48. The pedal of claim 43, wherein the alignment cavity is sized to generally correspond to the shape of the fastener.

49. The pedal of claim 48, wherein the alignment cavity is keyed to the shape of the fastener to prevent the fastener from being inserted into the cavity in a non-operable orientation.

50. The pedal of claim 43, wherein the alignment cavity is adapted to frictionally engage the fastener to retain the fastener within the alignment cavity.

51. The pedal of claim 43, in combination with a fastener adapted to be received into the alignment cavity through the opening and selectively retained at least partially within the alignment cavity by the retention structure.

52. The pedal of claim 51, in further combination with a children's ride-on vehicle comprising a frame with a seat sized to receive a child, a plurality of wheels rotatably coupled to the frame, a crankshaft coupled with at least one of the plurality of wheels to drive rotation of the at least one of the plurality of wheels and including a pair of ends that respectively extend into the bores of a pair of the pedals and are retained therein by a pair of the fasteners.

53. A pedal for a children's ride-on vehicle, the pedal comprising:
- a body having a foot engagement surface adapted to support a rider's foot;
- a bore extending at least partially through the body and adapted to receive a crankshaft;
- an alignment cavity at least partially coextensive with the bore and having a first opening adapted to receive a fastener in an operable orientation relative to the crankshaft; and
- a retention structure adapted to retain the fastener within the alignment cavity when the pedal is removed from the crankshaft, wherein the retention structure includes at least one protuberance adapted to extend partially into the alignment cavity and adapted to retain the fastener at least partially within the alignment cavity.

* * * * *

UNITED STATES PATENT AND TRADEMARK OFFICE
CERTIFICATE OF CORRECTION

PATENT NO. : 6,651,528 B2  Page 1 of 1
DATED : November 25, 2003
INVENTOR(S) : Daniel J. Damon and Gerald P. Sitarski It is certified that error appears in the above-identified patent and that said Letters Patent is hereby corrected as shown below:

Column 11,
Line 54, before "an expandable ring biased to constrict" please insert -- includes --.

Signed and Sealed this

Third Day of February, 2004

JON W. DUDAS
*Acting Director of the United States Patent and Trademark Office*